US012175576B2

(12) United States Patent
Sun et al.

(10) Patent No.: US 12,175,576 B2
(45) Date of Patent: Dec. 24, 2024

(54) METHOD, APPARATUS, DEVICE AND MEDIA FOR PUBLISHING VIDEO

(71) Applicant: Beijing Zitiao Network Technology Co., Ltd., Beijing (CN)

(72) Inventors: Hui Sun, Beijing (CN); Daoyu Wang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/329,430

(22) Filed: Jun. 5, 2023

(65) Prior Publication Data
US 2023/0326110 A1   Oct. 12, 2023

Related U.S. Application Data

(63) Continuation of application No. PCT/CN2021/141766, filed on Dec. 27, 2021.

(30) Foreign Application Priority Data

Jan. 7, 2021  (CN) .................... 202110020270.9

(51) Int. Cl.
*G06T 11/60* (2006.01)
*G06T 3/40* (2006.01)
(Continued)

(52) U.S. Cl.
CPC ............ *G06T 11/60* (2013.01); *G06T 3/40* (2013.01); *G06T 3/60* (2013.01); *G06T 7/90* (2017.01);
(Continued)

(58) Field of Classification Search
CPC .................... G06T 11/60; G06T 7/90
See application file for complete search history.

(56) References Cited

U.S. PATENT DOCUMENTS

2004/0100487 A1* 5/2004 Mori ............... H04N 21/426
2009/0300526 A1* 12/2009 Port ................ G06Q 30/02
715/764

(Continued)

FOREIGN PATENT DOCUMENTS

CN          1503159 A       6/2004
CN        107368491 A      11/2017
(Continued)

OTHER PUBLICATIONS

International Search Report issued in International Patent Application No. PCT/CN2021/141766 on Mar. 10, 2022.
(Continued)

*Primary Examiner* — Yi Yang
(74) *Attorney, Agent, or Firm* — Astute IP Law Group

(57) ABSTRACT

Embodiments of the present disclosure provide methods, apparatus, devices, and media for publishing video. In one exemplary method, acquiring an image and music; presenting the image on a canvas; determining a color of the canvas based on a color in the image; and generating the video for publishing by compositing the image, the canvas, and the music, wherein the video has the music as a soundtrack and statically presents the image on the canvas. In this way, users can freely edit an image and generate a high-quality video according to the edited image, which is beneficial to increase the user's enthusiasm for participating in short video creation and improve the user's viscosity.

14 Claims, 6 Drawing Sheets

(51) Int. Cl.
*G06T 3/60* (2006.01)
*G06T 7/90* (2017.01)
*G06V 10/56* (2022.01)

(52) U.S. Cl.
CPC .... *G06V 10/56* (2022.01); *G06T 2207/10024* (2013.01)

(56) References Cited

U.S. PATENT DOCUMENTS

| | | | | |
|---|---|---|---|---|
| 2010/0014390 | A1* | 1/2010 | Flum | G11B 27/105 369/4 |
| 2011/0243453 | A1* | 10/2011 | Kashima | G06F 16/5838 382/195 |
| 2012/0026307 | A1* | 2/2012 | Price | G09B 23/283 348/66 |
| 2019/0102914 | A1* | 4/2019 | Stefanov | G06T 7/90 |

FOREIGN PATENT DOCUMENTS

| | | |
|---|---|---|
| CN | 109922252 A | 6/2019 |
| CN | 110246523 A | 9/2019 |
| CN | 110263301 A | 9/2019 |
| CN | 110572717 A | 12/2019 |
| CN | 110781349 A | 2/2020 |
| CN | 112114929 A | 12/2020 |
| CN | 112153288 A | 12/2020 |
| CN | 112188266 A | 1/2021 |
| CN | 112862927 A | 5/2021 |
| CN | 113365134 A | 9/2021 |
| JP | 2005025715 A | 1/2005 |
| JP | 2008233576 A | 10/2008 |

OTHER PUBLICATIONS

Chinese First Office Action issued in Chinese Patent Application No. 202110020270.9 on Oct. 21, 2022.

T Xiao Douer, "How to shoot with Tiktok Shooting? Where is Tiktok Shooting?", <https://jingyan.baidu.com/articlef7c6Jb428cd5a8780642c903c.html>, Jan. 16, 2019, 7 pages.

"Story processing GIF stamp background + Minami frame Instagram Story Tutorials|GIF Sticker's Background| @moco_tutorials ," YouTube[online][video], 2020, 04 months, mainly refer to 0:22-0:24, 2:21-2:25, 2:56-3:12, and mainly refer to the. 11, [Search on Jan. 19, 2024], <URL:https://www.youtube.com/watch?v=2JqQGVZUGGK> 12 pages.

"Story processing to basic knitting," "instagram / image editing," YouTube[online][video], 2020, and mainly refer to 0:48-0:55, 4:55-5:01, and refer to the in question, on Apr. 4, 2007, [Search on Jan. 19, 2024], <URL: https://www.youtube.com/watch?v=BgN-vhXziKY>, 7 pages.

Office Action for Japanese Patent Application No. 2023-534108, mailed on Jul. 30, 2024, 12 pages.

Yano Sara , "Instagram's story in the story of", (animation animation) It begins to move! That a foppish text new function is an appearance, December [online], 2020, [Search on Jul. 19, 2024], <URL: https://isuta.jp/category/iphone/2020/12/606535>, 8 pages.

* cited by examiner

METHOD, APPARATUS, DEVICE AND MEDIA FOR PUBLISHING VIDEO

This application is a continuation of International Application No. PCT/CN2021/141766 filed on Dec. 27, 2021, which claims the priority to and benefits of Chinese Patent Application No. 202110020270.9, filed on Jan. 7, 2021. All the aforementioned patent applications are hereby incorporated by reference in their entireties.

FIELD

Embodiments of the present disclosure generally relate to the field of computers, and more particularly to a method, apparatus, electronic device, computer-readable storage media, and computer program product for publishing a video.

BACKGROUND

With the popularity of mobile terminals and the continuous improvement of network access speed, short video has gradually gained the favor of mobile terminal users thanks to its short time and strong entertainment characteristics. Users of each mobile terminal can not only act as recipients of information, but also act as producers and publishers of information, which greatly promotes users' enthusiasm to participate in short video creation. One of the schemes for generating short video is compositing images such as photographs. However, there is still room for improvement in various aspects of the presently known schemes.

SUMMARY

In a first aspect of the present disclosure, there is provided a method for publishing a video. The method comprises: acquiring an image and music; presenting the image on a canvas; determining a color of the canvas based on a color in the image; and generating the video for publishing by compositing the image, the canvas, and the music, wherein the video has the music as a soundtrack and statically presents the image on the canvas.

In a second aspect of the present disclosure, there is provided an apparatus for publishing a video. The method comprises: an acquisition module configured to acquire an image and music; a presentation module configured to present the image on a canvas; a determination module configured to determine a color of the canvas based on a color in the image; and a generation module configured to generate the video for publishing by compositing the image, the canvas, and the music, wherein the video has the music as a soundtrack and statically presents the image on the canvas.

In a third aspect of the present disclosure, there is provided an electronic device. The electronic device comprises a processor; and a memory for storing computer programs, the computer programs being executed by the processor to perform the method according to the first aspect.

In a fourth aspect of the present disclosure, there is provided a computer-readable storage medium having computer programs stored thereon, wherein the computer program are executed by a processor to perform the method according to the first aspect.

In a fifth aspect of the present disclosure, there is provided computer programs product comprising computer programs which, when executed by a processor, implement the method according to the first aspect.

According to the embodiments of the present disclosure, users can freely edit an image and generate a high-quality video according to the edited image, which is beneficial to increase the user's enthusiasm for participating in short video creation and improve the user's viscosity.

It should be understood that this Summary is not intended to identify key features or essential features of the present disclosure, nor is it intended to be used to limit the scope of the present disclosure. Other features of the present disclosure will become readily apparent from the following description.

DESCRIPTION OF DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

DETAILED DESCRIPTION OF EMBODIMENTS

The concepts of the present disclosure will now be described with reference to various exemplary embodiments as illustrated in the accompanying drawings. It should be understood that the description of these embodiments is merely intended to enable those skilled in the art to better understand and to further practice the present disclosure, and is not intended to limit the scope of the present disclosure in any way. It should be noted that where possible, similar or identical reference numbers may be used throughout the figures and may indicate similar or identical elements. It will be appreciated by those skilled in the art from the following description that alternative embodiments of the structures and/or methods illustrated herein may be employed without departing from the principles and concepts of the present disclosure as described.

As used herein, the term "includes" and its variants are to be read as open-ended terms that mean "includes, but is not limited to." The term "based on" is to be read as "based at least in part on." The terms "one example embodiment" and "one embodiment" are to be read as "at least one example embodiment." The term "a further embodiment" is to be read as "at least a further embodiment." Other terms that may occur, but are not mentioned herein, should not be interpreted or limited in a manner that is contrary to the concepts upon which the embodiments of the present disclosure are based, unless explicitly stated.

Figure 1:
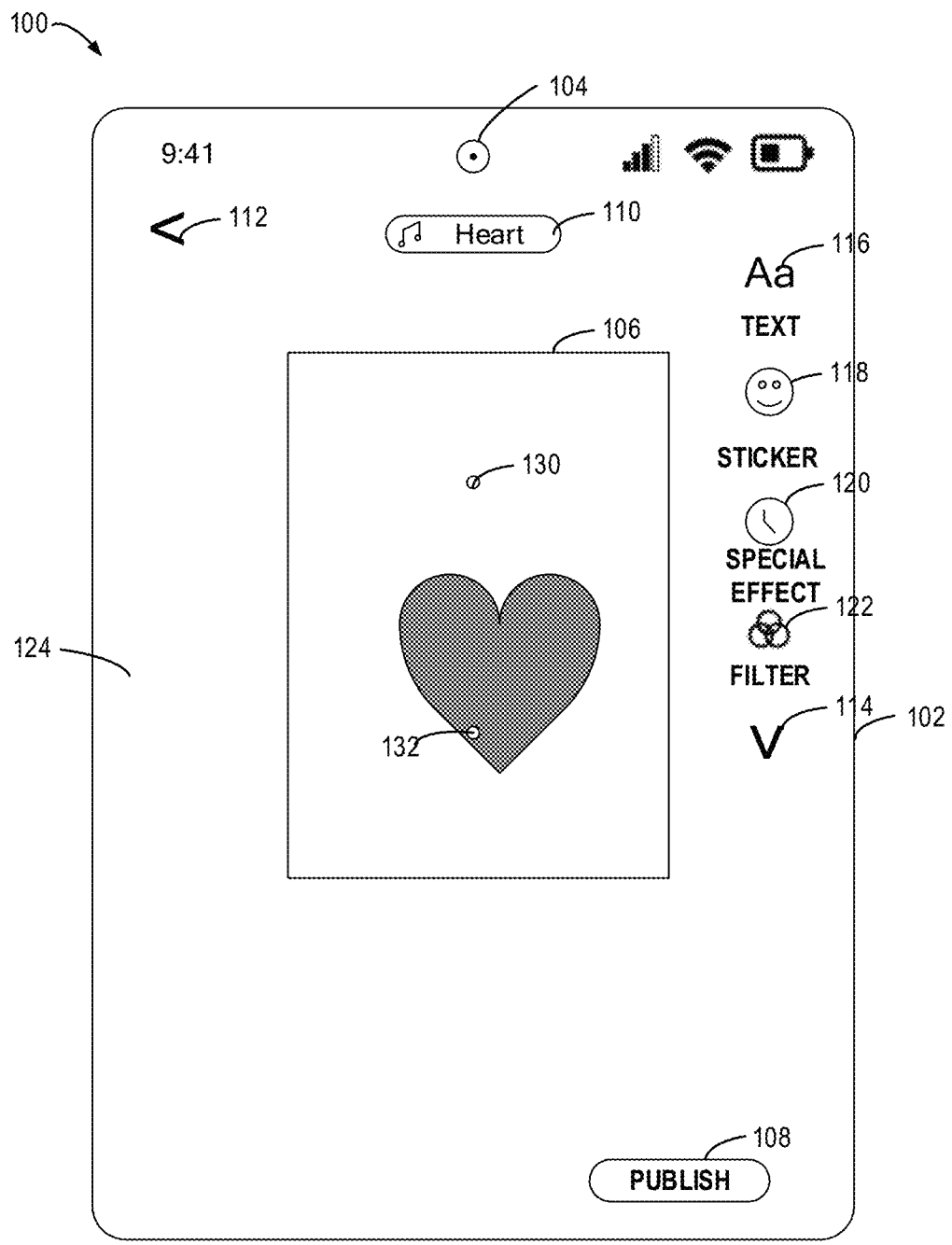
FIG. 1 illustrates an exemplary user interface of an electronic device according to some embodiments of the present disclosure.

FIG. 1 illustrates an exemplary user interface of an electronic device 100 according to some embodiments of the present disclosure. The electronic device 100 may be a cellular phone, a portable electronic device, a tablet computer, etc. As shown in FIG. 1, the electronic device 100 includes a display 102 that may be implemented by liquid crystal display (LCD) technology, organic light emitting diode (OLED) technology, or mini LED technology, but may be implemented by other display technologies in other embodiments. The display 102 may receive display information from a processor or the like of the electronic device 100 and provide visual output to a user based on the received display information. The visual output may include graphics, text, icons, video, and any combination thereof. For example, a portion of the visual output in the user interface may correspond to user interface elements, e. g., keys, icons, etc.

In some embodiments, the display 102 may be implemented by a touch sensitive display that provides input and output interfaces between the electronic device 100 and a user. Touch sensitive displays are sometimes referred to for convenience as "touch screens". The display 102 may include a touch sensitive surface, a sensor, and/or an array of sensors that receive input from a user based on haptic sensations. These sensors may detect contact or proximity on the display 102 and translate the detected contact into interaction with user interface elements on the display 102. It should be appreciated that the display 102 may be implemented using a variety of touch sensing technologies now known or later developed, including but not limited to capacitive, resistive, and surface acoustic wave technologies. In some embodiments, a user may interact with the display 102 using a finger or stylus.

As shown in FIG. 1, the electronic device 100 also includes a camera 104, also referred to as a camera head, disposed within the display 102. The camera 104 is provided on the front surface of the electronic device 100, which acts as a front camera for the user to perform self-shooting creation. The camera layout shown in FIG. 1 is a "cutout screen" layout, and in other embodiments, the electronic device 100 may use other suitable layouts, such as a non-full screen layout or a "pop-up" layout. In addition to the camera 104, the electronic device 100 may also include one or more cameras (not shown) disposed on the back side, i. e., a rear camera, to provide enhanced camera functionality. A user can switch between the front camera and the rear camera by clicking an icon for switching cameras, etc.

As shown in FIG. 1, display 102 presents an edit interface for an application for video sharing. A canvas 124 may be presented in the edit interface and an image 106 is presented on the canvas 124. The image 106 may be a photograph taken by the user, a photograph selected by the user from an album (e. g., a local album or a cloud album), etc. For example, the application may call a camera (e. g., camera 104) to take a photograph and present the photograph on the canvas 124. As another example, the application may also call up an image such as a photograph in an album and present the photograph on the canvas 124.

It should be understood that "canvas" herein merely refers to the manner in which it is presented and does not imply an implementation. In particular, the canvas 124, as a background for the image 106, serves for presenting the image 106 on the canvas 124. The canvas 124 may further allow a user to edit the image 106 on the canvas 124. The canvas 124 may be implemented or implemented in a variety of different ways. For example, the canvas could be implemented by using a background image, or could be implemented by a container.

In some embodiments, a color may be extracted from the image 106 and a color of the canvas 124 determined based on the color extracted from the image 106. Since the color of the canvas 124 is extracted from the image 106, harmony of the entire picture can be ensured. The visual impact and user satisfaction of the work is significantly improved compared to presenting a black or white border around the image 106. Alternatively, the canvas 124 can be made by Gaussian blurring the image 106.

In some embodiments, a color may be extracted from the image 106 and used as the color of the canvas 124. For example, the background color of the image 106 may be extracted from the image 106. In general, the background occupies most of the area of the image 106, so extracting the background color of the image 106 as the color of the canvas 124 allows for a smoother transition. As another example, the foreground color of the image 106, e. g., the color of the main object, may be extracted from the image 106. For example, the foreground color of the image 106 is the color of a heart pattern. In this manner, the dominant hue of the main display object in image 106 may be presented in canvas 124.

In some embodiments, the edit interface may include a plurality of editing user interface elements, e. g., a text user interface element 116, a sticker user interface element 118, an effect user interface element 120, and a filter user interface element 122, etc. A user can edit the image 106 through these editing user interface elements. For example, a user may click on the text user interface element 116 to add text to the image 106, click on sticker user interface element 118 to add a sticker to the image 106, click on an effect user interface element 120 to apply the effect to the image 106, or click on filter user interface element 122 to adjust the filter of the image 106. In addition, a user may click on a user interface element 15 to expand more editing user interface elements for more editing functions. It should be understood that the edit interface may provide more or fewer editing user interface elements. For example, these editing functions may be applied to the entire video generated based on the image 106.

In some embodiments, the edit interface may include a plurality of editing user interface elements, e. g., a text user interface element 116, a sticker user interface element 118, a special effect user interface element 120, and a filter user interface element 122, etc. A user can edit the image 106 through these editing user interface elements. For example, a user may click on the text user interface element 116 to add text to the image 106, click on sticker user interface element 118 to add a sticker to the image 106, click on a special effect user interface element 120 to apply the special effect to the image 106, or click on filter user interface element to adjust the filter of the image 106. In addition, a user may click on a user interface element 15 to expand more editing user interface elements for more editing functions. It should be understood that the edit interface may provide more or fewer editing user interface elements. For example, these editing functions may be applied to the entire video generated based on the image 106.

As shown in FIG. 1, a user may select music at a music selection user interface element 110 as a soundtrack for a video, e. g., "Heart". Alternatively, the application may also image process the image 106 to acquire information about the image and automatically recommend music as a soundtrack for the video based on the information of the image. For example, the image 106 may contain metadata of shot locations, exposure conditions, etc. from which the application may infer the user's shot scene and possible moods so as to recommend corresponding music. Additionally, the application may identify scenes in the image 106 and recommend music correspondingly.

If a user is not satisfied with the photographing effect, he/she may click to return to a user interface element 127 to a photographing interface for re-photographing. Alternatively, if the user wants to change other images in the album, he/she may click to return to the user interface element 127 to the album interface to re-select the image.

Figure 2:
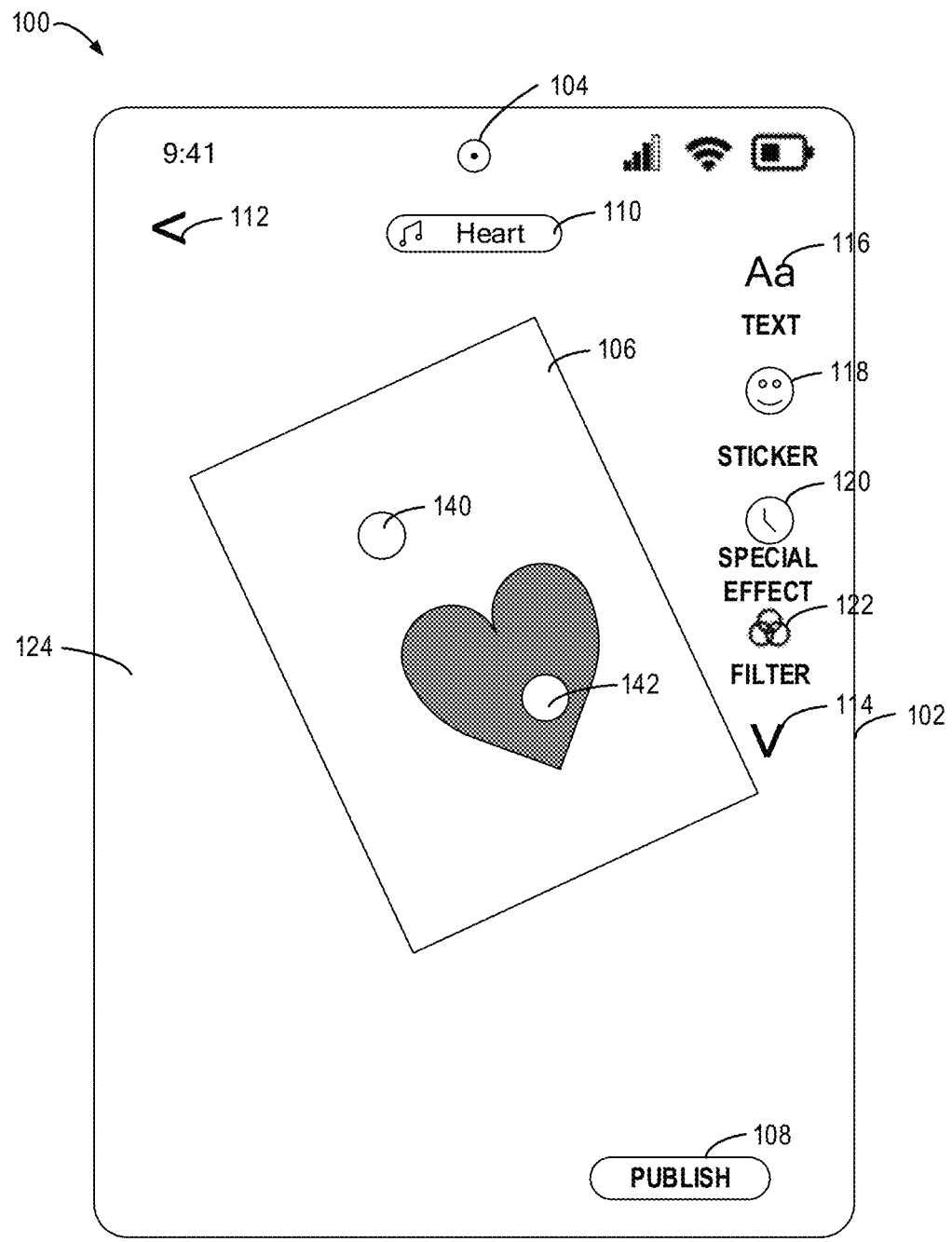
FIG. 2 illustrates an exemplary user interface of an electronic device according to some embodiments of the present disclosure.

FIG. 2 illustrates an exemplary user interface of an electronic device 100 according to some embodiments of the present disclosure. As shown in FIG. 2, the user may edit the image on the canvas 124. For example, the user performs, on the canvas 124, an edit operation with the image 106 as a graphical object, thereby enabling free editing of the image 106. For example, the user may zoom, rotate, and/or drag the image 106. As shown in FIG. 2, a user's finger contacts the display 102 at positions 50 and 52 to perform a two-finger gesture operation which may be used to zoom or rotate the image 106, etc. In addition, the user may also drag the edges of the image 106 to stretch or shrink the image 106. It should be appreciated that the user may also edit the image 106 using other suitable gesture or the like.

After the user performs an edit operation, the electronic device 100 may present a corresponding edit effect on the display 102. For example, as shown in FIG. 2, the rotation effect of the image 106 may be displayed on the display 102 in real time as the user performs a rotation gesture at the locations 50 and 52. The zoom effect of the image 106 may also be displayed on the display 102 in real time as the user performs the zoom operation. The dragging effect of the image 106 may also be displayed in real time on the display 102 when the user performs a dragging operation. Other edit effects of the image 106 may also be displayed on the display 102 in real time as the user performs other edit operations. By freely editing images on the canvas and combining the edited images with the canvas to generate high quality video, the user's enthusiasm for participating in short video authoring can be increased, and the user's viscosity can be increased.

In some embodiments, the color of the canvas 124 may remain unchanged during user editing of the image 106. For example, in FIG. 2, the color of the canvas 124 may be the same as the color in FIG. 1. In other embodiments, during user editing of the image 106, the color of canvas 124 may change in real-time to accommodate the edited image. For example, in FIG. 2, the dominant hue of the top half of the canvas 124 may be determined based on the color of the center point of the top half of the image 106, and the dominant hue of the bottom half of the canvas 124 may be determined based on the color of the center point of the bottom half of the image 106. As the image 106 is rotated, the shape of the top and bottom halves of the image changes from rectangular to trapezoidal and the center position of the image 106 changes.

In some embodiments, after the user completes image editing, the user may click on a publishing user interface element 108 to publish the video. Meanwhile, the application may determine the length of the video to be generated based on the image 106, for example, the application may determine the length of the music based on the length of the music in order to preserve the integrity of the music and ensure a complete soundtrack experience.

Figure 3:
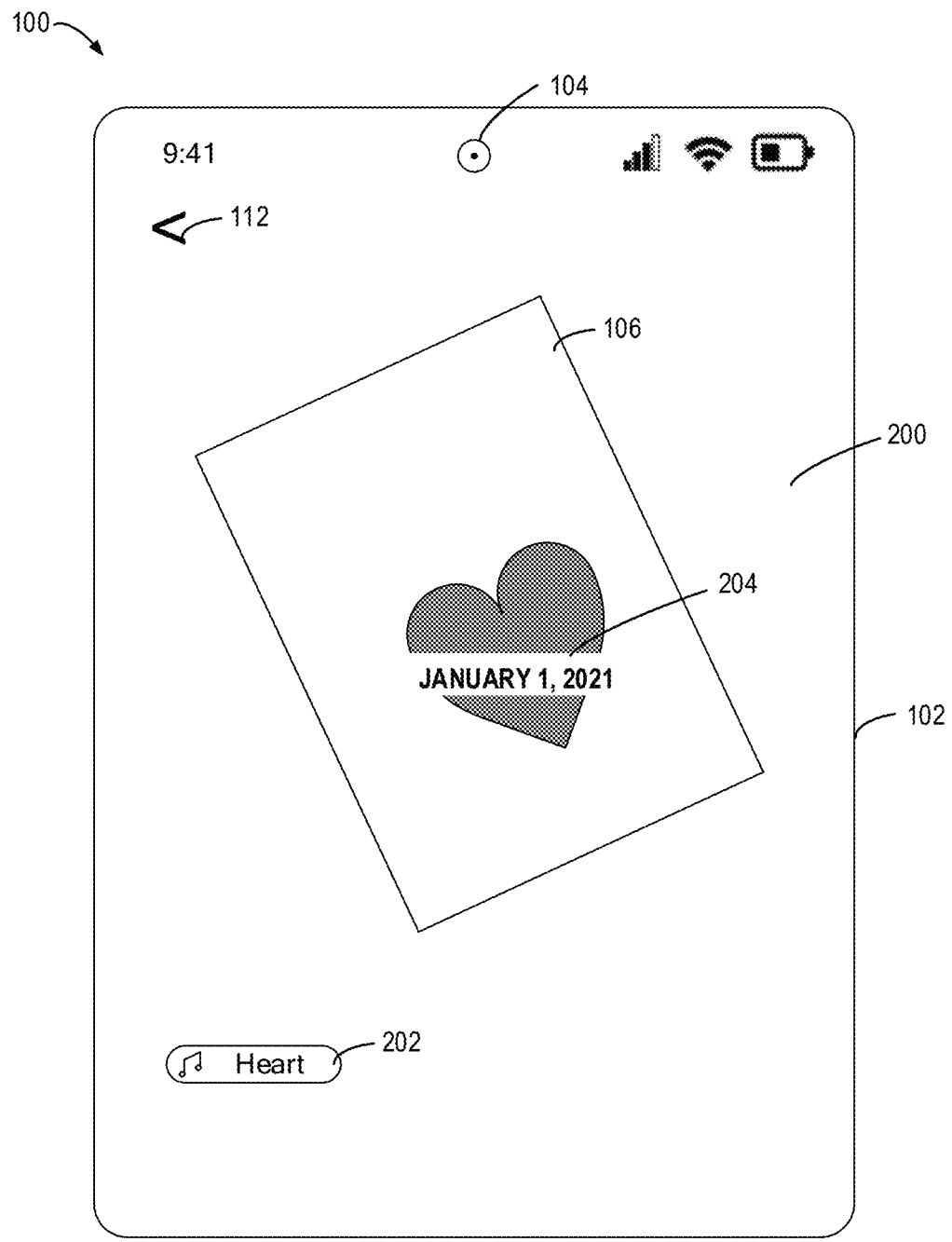
FIG. 3 illustrates an exemplary user interface of an electronic device according to some embodiments of the present disclosure.

FIG. 3 illustrates an exemplary user interface of an electronic device 100 according to some embodiments of the present disclosure. The user interface shows a video 200 generated by compositing the image 106, the canvas 124, and the music, which statically presents the image 106 throughout the length of the video 200. By statically presenting the image 106 in the video 200, the size of the video 200 is not increased significantly while assuring the quality of the image in the video 200. In this manner, video can be conveniently shared over a network and the user's visual experience is enhanced.

In some embodiments, the video 200 may be generated by integrating the image 106 with the canvas 124. The color of the canvas 124 can ensure overall picture harmony in the manner described above.

In some embodiments, an icon of the music, as well as a name thereof may be displayed at a location 202 of the video 200, or lyrics of a song may be scrolled, etc. It should be understood that the location 202 is provided by way of example only and may be displayed in any other suitable location of the video 200.

In some embodiments, the dynamic sticker 204 may be presented in the video 200, wherein the dynamic sticker 204. By adding dynamic elements in the static image, the visual experience of the video can be enhanced. For example, the dynamic sticker 204 may be a dynamic timestamp sticker dynamically presenting a timestamp, such as "Jan. 1, 2021".

In some embodiments, the dynamic sticker 204 may be presented according to the tempo of the music. For example, when the music tempo is fast, the dynamic presenting of the dynamic sticker 204 is also fast. Conversely, when the music tempo is slower, the dynamic presenting of the dynamic sticker 204 is also slower. In this manner, a sense of rhythm of the video can be enhanced.

In some embodiments, the dynamic sticker 204 may be automatically generated by the application, e. g., the dynamic timestamp sticker displays a time or a date when the video was made. For example, after the user clicks on the publishing user interface element 108, the dynamic sticker 204 is added when the video 200 is generated. Alternatively, the dynamic sticker 204 may be generated by the user editing. For example, the user may click on the text user interface element 116 shown in FIG. 2 to add a text box or text in the canvas 124. These texts are then converted to the dynamic stickers 204 when the video 200 is generated after the user clicks on the publishing user interface element 108.

Figure 4:
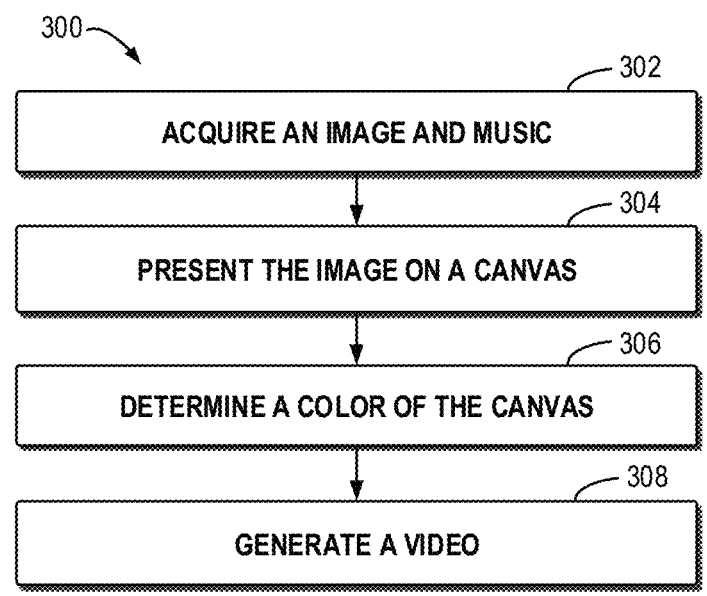
FIG. 4 illustrates a flowchart of a method for publishing a video according to some embodiments of the present disclosure.

FIG. 4 illustrates a flowchart of a method 300 for publishing a video according to some embodiments of the present disclosure. For example, the method 300 may be implemented at the electronic device 100. At block 302, the image and the music are acquired. For example, the image may be acquired by photographing or by selecting an image from an album. As another example, the music matching the image may be automatically loaded, or the music may be randomly loaded. The user may also manually select the music, for example, through the music selection user interface element 110.

At block 304, the image is presented on the canvas. For example, as shown in FIGS. 1-2, the image 106 may be displayed on the canvas 124.

At block 306, the color of the canvas 124 is determined based on the color in the image 106. For example, the color of the canvas may be determined from the color of one or more regions in the image such that different colors of the canvas may be presented for different images.

It should be noted that although block 306 is shown in FIG. 3 as following block 304, block 306 and block 304 may be performed in other orders. That is, block 306 may be performed before block 304 or in parallel with block 304. For example, during loading the image, the canvas and the image may be presented simultaneously. At this point, the color of the canvas may have been determined based on the color of the image. That is, the color of the canvas may have been determined prior to presenting the canvas and the image.

In some embodiments, a first color is extracted from a first portion of the image. A second color is extracted from a second portion of the image. The color of the canvas is determined based on the first color and a second color, wherein the color of the canvas gradients from the first color to the second color, from a first area of the canvas adjacent to the first portion to a second area of the canvas adjacent to the second portion. For example, the first portion may be the top half of the image 106 up and down the display 102 in FIG. 2, and the second portion may be the bottom half of the image 106 up and down the display 102 in FIG. 2. Alternatively, the first portion may be the upper half of the image 106 along a long side direction of the image 106 in FIG. 2, and the second portion may be the lower half of the image along the long side direction of the image 106 in FIG. 2.

In some embodiments, an edit operation is received on the canvas 124 with the image as a graphical object. For example, the edit operation may be zooming, rotating or dragging the image 106.

In some embodiments, in response to receiving an edit operation, an edit effect on the image 106 is presented on the canvas 124. The video is generated by compositing the edited image, the canvas, and the music, wherein the video has the music as a soundtrack and statically presents the edited image on the canvas. By presenting the edit effect, the user can get real-time feedback, thereby facilitating modification and adjustment.

At block 308, a video is generated by compositing the image 106, the canvas 124, and music, wherein the video has the music as a soundtrack and statically presents the image 106 on the canvas 124. In some embodiments, the length of the video is determined based on the length of the music. For example, the length of the video is equal to the length of the music, thereby ensuring a complete soundtrack experience.

In some embodiments, a dynamic sticker is presented in a video, wherein the dynamic sticker presents text dynamically. For example, the dynamic sticker includes a dynamic timestamp sticker dynamically presenting the timestamp. For example, the dynamic sticker is presented at the tempo of the music.

In some embodiments, an input to add text on the canvas may be received, and in response to receiving the input, the input text may be presented on the canvas. The dynamic sticker is then generated based on the input text.

Figure 5:
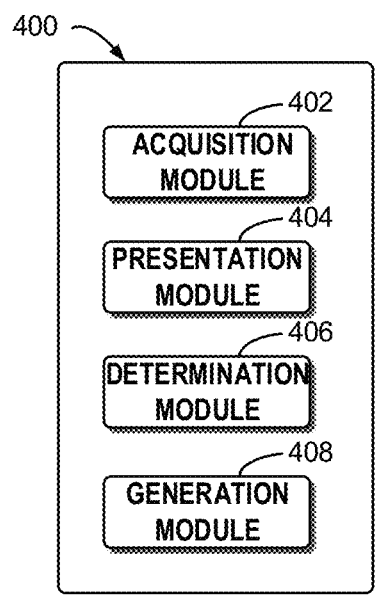
FIG. 5 illustrates a block diagram of apparatus for publishing a video according to some embodiments of the present disclosure.

FIG. 5 illustrates a block diagram of apparatus 400 for publishing a video according to some embodiments of the present disclosure. The apparatus 400 comprises: an acquisition module 402 configured to acquire the image and the music; a presentation module 404 configured to present the image on the canvas; a determination module 406 configured to determine the color of the canvas based on the color in the image; and a generation module 408 configured to generate the video for publishing by compositing the image, the canvas, and the music, wherein the video has the music as a soundtrack and statically presents the image on the canvas.

In some embodiments, the generation module 408 is configured to receive, on the canvas, an edit operation with the image as the graphical object; and generating the video by compositing the edited image, the canvas, and the music, wherein the video has the music as the soundtrack and statically presents the edited image.

In some embodiments, the generation module 408 is further configured to present an edit effect on the image on the canvas in response to receiving the edit operation.

In some embodiments, the apparatus 400 further comprises: a first extraction module configured to extract a first color from the first portion of the image; a second extraction module configured to extract a second color from the second portion of the image; and a determination module configured to determine the color of the canvas based on the first color and the second color, wherein the color of the canvas gradients from the first color to the second color from the first area of the canvas adjacent to the first portion to the second area of the canvas adjacent to the second portion.

In some embodiments, the apparatus 400 further comprises: a determination module configured to determine the length of the video based on the length of the music.

In some embodiments, the generation module 408 is further configured to present the dynamic sticker in the video, wherein the dynamic sticker dynamically presents text. In some embodiments, the dynamic sticker includes the dynamic timestamp sticker dynamically presenting the timestamp. In some embodiments, presenting the dynamic sticker includes presenting the dynamic sticker at the tempo of the music.

In some embodiments, the apparatus 400 further comprises: another receiving module configured to receive an input to add text on the canvas; another presenting module configured to present the text on the canvas in response to receiving the input; and another generation module configured to generate the dynamic sticker based on the text.

In some embodiments, the edit operation with the image as the graphical object comprises at least one of: zooming, rotating, or dragging the image.

Figure 6:
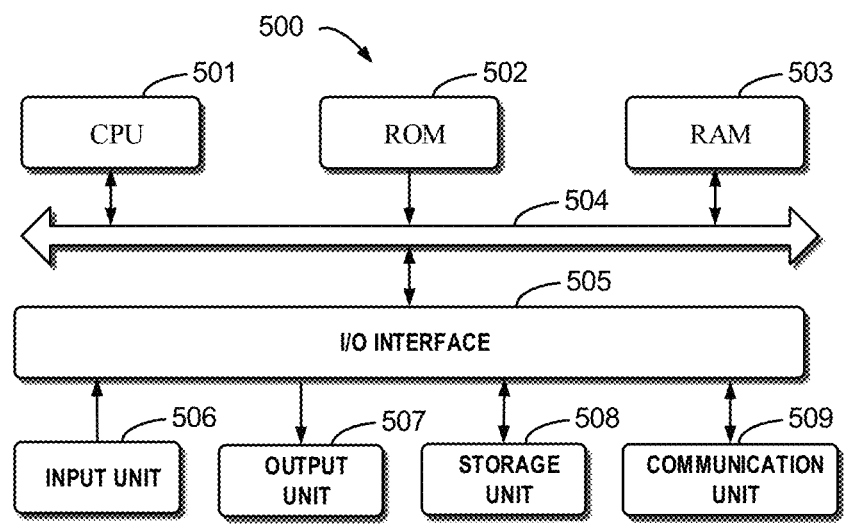
FIG. 6 illustrates a block diagram of an electronic device capable of implementing some embodiments of the present disclosure.

FIG. 6 illustrates a block diagram of an electronic device 500 capable of implementing some embodiments of the present disclosure. The electronic device 100 as shown in FIGS. 1-3 or the apparatus 400 as shown in FIG. 5 may be implemented by a device 500. As shown in FIG. 6, the device 500 includes a central process unit (CPU) 501, which can execute various suitable actions and processing based on the computer program instructions stored in the read-only memory (ROM) 502 or computer program instructions loaded in the random-access memory (RAM) 503 from a storage unit 508. The RAM 503 can also store all kinds of programs and data required by the operations of the device 500. CPU 501, ROM 502 and RAM are connected to each other via a bus 504. The input/output (I/O) interface 505 is also connected to the bus 504.

A plurality of components in the device 500 is connected to the I/O interface 505, including: an input unit 506, such as keyboard, mouse and the like; an output unit 507, e.g., various kinds of display and loudspeakers etc.; a storage unit 508, such as magnetic disk and optical disk etc.; and a communication unit 509, such as network card, modem, wireless transceiver and the like. The communication unit 509 allows the device 500 to exchange information/data with other devices via the computer network, such as Internet, and/or various telecommunication networks.

The above described each procedure and processing, such as the method 300, can also be executed by the processing unit 501. For example, in some embodiments, the method 300 can be implemented as a computer software program tangibly included in the machine-readable medium, e.g., storage unit 508. In some embodiments, the computer programs can be partially or fully loaded and/or mounted to the device 500 via ROM 502 and/or communication unit 509. When the computer programs are loaded to RAM 503 and executed by the CPU 501, one or more steps of the above described method 300 can be implemented. Alternatively, in other embodiments, CPU 501 may be configured to perform method 300 in any other suitable manner (e. g., via firmware).

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable other ordinary skilled in the art to understand implementations of the present disclosure.

What is claimed is:

1. A method for publishing a video, comprising:
acquiring an image and music;
presenting the image on a canvas;
determining a color of the canvas based on a color in the image, wherein determining the color of the canvas comprises:
extracting a first color at a first location of a first portion of the image;
extracting a second color at a second location of a second portion of the image; and
determining a color of the canvas based on the first color and the second color, wherein the color of the canvas is graded from the first color to the second color from a first area of the canvas adjacent to the first portion to a second area of the canvas adjacent to the second portion, wherein the image rotates according to a received editing operation, and the shape of the first portion and the shape of the second portion, and the first position and the second position change based on the rotation such that the color of the canvas changes in real time according to the editing operation; and
generating the video for publishing by compositing the image, the canvas, and the music, wherein the video has the music as a soundtrack and statically presents the image on the canvas, wherein the image in the video is added with a dynamic sticker and an effect, wherein the dynamic sticker comprises a dynamic timestamp sticker dynamically presenting a timestamp, the dynamic sticker is generated automatically and presented at a tempo of the music, and the effect is applied to the image in the video.

2. The method of claim 1, wherein the first location and the second location are geometric centers of the first portion and the second portion, respectively.

3. The method of claim 2, wherein the first portion and the second portion change from rectangular to trapezoidal in response to the editing operation.

4. The method of claim 2, wherein the edit operation with the image as a graphical object comprises at least one of: zooming, rotating, or dragging the image.

5. The method of claim 1, further comprising:
determining a length of the video based on a length of the music.

6. The method of claim 1, wherein generating the video further comprises presenting the dynamic sticker in the video, wherein the dynamic sticker dynamically presents a text.

7. The method of claim 6, further comprising:
receiving an input to add a text on the canvas;
presenting the text on the canvas in response to receiving the input; and
generating the dynamic sticker based on the text.

8. An electronic device, comprising:
a processor; and
a memory for storing computer programs, the computer programs being executed by the processor to perform a method, the method comprising:
acquiring an image and music;
presenting the image on a canvas;
determining a color of the canvas based on a color in the image, wherein determining the color of the canvas comprises:
extracting a first color at a first location of a first portion of the image;
extracting a second color at a second location of a second portion of the image; and
determining a color of the canvas based on the first color and the second color, wherein the color of the canvas is graded from the first color to the second color from a first area of the canvas adjacent to the first portion to a second area of the canvas adjacent to the second portion, wherein the image rotates according to a received editing operation, and the shape of the first portion and the shape of the second portion, and the first position and the second position change based on the rotation such that the color of the canvas changes in real time according to the editing operation; and
generating a video for publishing by compositing the image, the canvas, and the music, wherein the video has the music as a soundtrack and statically presents the image on the canvas, wherein the image in the video is added with a dynamic sticker and an effect, wherein the dynamic sticker comprises a dynamic timestamp sticker dynamically presenting a timestamp, the dynamic sticker is generated automatically and presented at a tempo of the music, and the effect is applied to the image in the video.

9. The device of claim 8, wherein the first location and the second location are geometric centers of the first portion and the second portion, respectively.

10. The device of claim 9, wherein the first portion and the second portion change from rectangular to trapezoidal in response to the editing operations.

11. The device of claim 8, the method further comprising:
determining a length of the video based on a length of the music.

12. The device of claim 8, wherein generating the video further comprises presenting the dynamic sticker in the video, wherein the dynamic sticker dynamically presents a text.

13. The device of claim 12, the method further comprising:
receiving an input to add a text on the canvas;
presenting the text on the canvas in response to receiving the input; and
generating the dynamic sticker based on the text.

14. A non-transitory computer-readable storage medium having computer programs stored thereon, wherein the computer programs are executed by a processor to perform a method, the method comprising:
acquiring an image and music;
presenting the image on a canvas;
determining a color of the canvas based on a color in the image, and wherein determining the color of the canvas comprises:
extracting a first color at a first location of a first portion of the image;
extracting a second color at a second location of a second portion of the image; and
determining a color of the canvas based on the first color and the second color, wherein the color of the canvas is graded from the first color to the second color from a first area of the canvas adjacent to the first portion to a second area of the canvas adjacent to the second portion, wherein the image rotates according to a received editing operation, and the shape of the first portion and the shape of the second portion, and the first position and the second position change based on the rotation such that the color of the canvas changes in real time according to the editing operation; and generating a video for publishing by compositing the image, the canvas, and the music, wherein the video has the music as a soundtrack and statically presents the image on the canvas, wherein the image in the video is added with a dynamic sticker and an effect, wherein the dynamic sticker comprises a dynamic timestamp sticker dynamically presenting a timestamp, the dynamic sticker is generated automatically and presented at a tempo of the music, and the effect is applied to the image in the video.

\* \* \* \* \*